US009451428B2

(12) United States Patent
Ling et al.

(10) Patent No.: US 9,451,428 B2
(45) Date of Patent: *Sep. 20, 2016

(54) METHOD AND SYSTEM FOR PROCESSING QUERIES INITIATED BY USERS OF MOBILE DEVICES

(71) Applicant: Google Inc., Mountain View, CA (US)

(72) Inventors: Benjamin Ling, San Francisco, CA (US); Jie J. Wu, Mountain View, CA (US); Jian Gong Deng, Sunnyvale, CA (US); Hanping Feng, Beijing (CN)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/338,451

(22) Filed: Jul. 23, 2014

(65) Prior Publication Data

US 2014/0337311 A1 Nov. 13, 2014

Related U.S. Application Data

(63) Continuation of application No. 13/619,872, filed on Sep. 14, 2012, now Pat. No. 8,805,345, which is a continuation of application No. 12/652,646, filed on Jan. 5, 2010, now Pat. No. 8,306,511, which is a continuation of application No. 10/957,115, filed on Sep. 30, 2004, now Pat. No. 7,643,822.

(51) Int. Cl.
*H04W 4/14* (2009.01)
*H04L 12/58* (2006.01)
*G06F 17/30* (2006.01)

(52) U.S. Cl.
CPC .......... *H04W 4/14* (2013.01); *G06F 17/30867* (2013.01); *G06F 17/30979* (2013.01); *H04L 51/066* (2013.01)

(58) Field of Classification Search
CPC . H04L 51/066; H04L 12/5895; H04L 12/14; H04L 12/1859; H04L 12/581; H04L 51/04; H04L 51/38; H04W 4/14; H04W 4/12; H04W 88/02; H04W 88/184; H04W 4/00; H04M 1/0214; H04M 1/72552; G06F 12/30867; G06F 17/30979
USPC ......... 455/414.1, 412.2, 414.2, 414.3, 412.1, 455/418, 466, 456.1, 456.3, 556.2, 419; 707/706, 710, 723, 732, 748, 779, 707/999.001, 999.003, 999.007, 769; 709/206, 207, 217, 246
See application file for complete search history.

(56) References Cited

U.S. PATENT DOCUMENTS 6,167,255 A 12/2000 Kennedy et al.
6,253,188 B1 6/2001 Witek et al.

(Continued)

FOREIGN PATENT DOCUMENTS

| CN | 1339752 | 3/2002 |
|---|---|---|
| EP | 1372303 | 12/2003 |

(Continued)

OTHER PUBLICATIONS

Communication from Canadian associate regarding Examiner's Report from Canadian Patent Office for Canadian Patent Serial No. 2582523, dated Jun. 23, 2011, 3 pgs.

(Continued)

*Primary Examiner* — Inder Mehra
(74) *Attorney, Agent, or Firm* — Fish & Richardson P.C.

(57) ABSTRACT

In one embodiment, a method for processing queries initiated by users of mobile devices includes receiving an incoming message containing a query initiated by a user of a mobile device, and extracting the query from the received message. The message further includes obtaining a result of the query and creating an outgoing message with the result of the query for delivery to the mobile device.

18 Claims, 7 Drawing Sheets

(56) References Cited

U.S. PATENT DOCUMENTS

| | | | |
|---|---|---|---|
| 6,847,959 | B1 | 1/2005 | Arrouye et al. |
| 6,990,633 | B1 | 1/2006 | Miyasaka et al. |
| 7,305,252 | B2 | 12/2007 | Britt et al. |
| 7,643,822 | B2 * | 1/2010 | Ling ............... G06F 17/30979 455/412.2 |
| 8,086,604 | B2 | 12/2011 | Arrouye et al. |
| 8,306,511 | B2 * | 11/2012 | Ling ............... G06F 17/30979 455/412.1 |
| 8,805,345 | B2 * | 8/2014 | Ling ............... G06F 17/30979 455/412.1 |
| 2002/0142787 | A1 | 10/2002 | Holley et al. |
| 2003/0120654 | A1 * | 6/2003 | Edlund ............ G06F 17/30864 |
| 2003/0195883 | A1 * | 10/2003 | Mojsilovic ....... G06F 17/30256 |
| 2005/0186969 | A1 * | 8/2005 | Lohtia ..................... H04W 4/14 455/456.3 |
| 2006/0009243 | A1 * | 1/2006 | Dahan .................. H04L 12/581 455/466 |
| 2006/0063515 | A1 * | 3/2006 | Alston .................. G06Q 30/02 455/414.1 |
| 2006/0184514 | A1 * | 8/2006 | Meng ............... G06F 17/30864 |
| 2007/0288648 | A1 | 12/2007 | Mehanna et al. |
| 2009/0024316 | A1 * | 1/2009 | Sutanto ............ G08G 1/096811 701/533 |
| 2010/0228713 | A1 | 9/2010 | Ling et al. |

FOREIGN PATENT DOCUMENTS

| | | |
|---|---|---|
| KR | 10-2002-0097456 | 12/2002 |
| WO | 97/21183 | 6/1997 |

OTHER PUBLICATIONS

Communication from Chinese associate regarding the Third Office Action from Chinese State Intellectual Property Office (SIPO) for Chinese Patent Application No. 200580038579.X, dated Aug. 4, 2011, 7 pgs.

Communication from Korean associate regarding the first Notice of Preliminary Rejection (Detailed Report) from the Korean Patent Office for Korean Patent Application No. 2007-7009690, dated Jun. 22, 2011, 2 pgs.

Communication from Canadian associate regarding responding to the Examiner's Report dated Jun. 16, 2011, filed with the Canadian Patent Office for Canadian Patent Serial No. 2582523, dated Dec. 13, 2011, 20 pgs.

Communication from Chinese associate regarding the Fourth Notification from Chinese State Intellectual Property Office (SIPO) for Chinese Patent Application No. 200580038579.X, dated Jan. 31, 2012, 8 pgs.

Communication from European Patent Office regarding the Communication pursuant to Article 94(3) EPC for European Patent Application No. 05 791 279.2-2416, dated Jan. 11, 2012, 9 pgs.

Non-Final Office Action from U.S. Appl. No. 10/957,115, dated Jun. 6, 2006, 12 pp.

Response to Non-Final Office Action dated Jun. 6, 2006, from U.S. Appl. No. 10/957,115, filed Oct. 6, 2006, 11 pp.

Final Office Action from U.S. Appl. No. 10/957,115, dated Dec. 29, 2006, 13 pp.

Response to Final Office Action dated Dec. 29, 2006, From U.S. Appl. No. 10/957,115, dated Mar. 28, 2007, 11 pp.

Non-Final Office Action from U.S. Appl. No. 10/957,115, dated Jun. 8, 2007, 13 pp.

Response to Non-Final Office Action dated Jun. 8, 2007, from U.S. Appl. No. 10/957,115, filed Nov. 6, 2007, 11 pp.

Non-Final Office Action from U.S. Appl. No. 10/957,115 dated Feb. 5, 2008, 15 pp.

Response to Non-Final Office Action dated Feb. 5, 2008, from U.S. Appl. No. 10/957,115, filed May 5, 2008, 13 pp.

Final Office Action from U.S. Appl. No. 10/957,115 dated Sep. 4, 2008, 17 pp.

Response to Final Office Action dated Sep. 4, 2008, from U.S. Appl. No. 10/957,115, filed Dec. 4, 2008, 13 pp.

Non-Final Office Action from U.S. Appl. No. 10/957,115, dated Feb. 11, 2009, 17 pp.

Response to Non-Final Office Action dated Feb. 11, 2009, from U.S. Appl. No. 10/957,115, filed May 11, 2009, 13 pp.

Notice of Allowance from U.S. Appl. No. 10/957,115, dated Aug. 19, 2009, 10 pp.

Non-Final Office Action from U.S. Appl. No. 12/652,646, dated Nov. 25, 2011, 22 pp.

Response to Non-Final Office Action dated Nov. 25, 2011, from U.S. Appl. No. 12/652,646, filed Mar. 26, 2012.

Notice of Allowance and Fees Due from U.S. Appl. No. 12/652,646, dated Jul. 11, 2012, 12 pp.

Communication from Korean associate regarding Amendment and Argument against the Korean Office Action and filed with the Korean Patent Office for Korean Patent Application No. 2007-7009690, dated Sep. 21, 2011, 26 pgs.

Communication from Chinese associate regarding responding to the 3rd Office Action filed with the Chinese Patent Office for Chinese Patent Application No. 200580038579.X, dated Oct. 9, 2011, 11 pgs. (no translation available).

Response to Communication from Chinese associate regarding Decision of Rejection dated Jul. 3, 2012, for Chinese Patent Application No. 200580038579.X, filed Sep. 17, 2012, 22 pgs.

First Examination Report from Indian corresponding patent application No. 1319/CHENP/2007, dated May 22, 2013, 2 pp.

Communication (translation) from Korean Patent Office regarding the first Notice of Preliminary Rejection for Korean Patent Application No. 2007-7009690, dated Jun. 22, 2011, 4 pgs.

* cited by examiner

METHOD AND SYSTEM FOR PROCESSING QUERIES INITIATED BY USERS OF MOBILE DEVICES

RELATED APPLICATIONS

This is a continuation of U.S. application Ser. No. 13/619,872, filed Sep. 14, 2012, which is a continuation of U.S. application Ser. No. 12/652,646, filed Jan. 5, 2010, which is a continuation of U.S. application Ser. No. 10/957,115, filed on Sep. 30, 2004, the entirety of each of which are incorporated herein by reference.

FIELD OF INVENTION

The field of invention relates generally to wireless data communication, and more particularly, to processing queries initiated by users of mobile devices.

BACKGROUND

Message exchange services for mobile phones are extremely popular in Europe. According to statistical data, over 20 billion messages were sent in 2003 in the United Kingdom alone. The U.S. market for mobile phone message exchange is also rapidly growing.

One exemplary mobile phone message exchange service is SMS (Short Message Service). SMS provides for sending messages of up to 160 characters (224 characters if using a 5-bit mode) to mobile phones that use Global System for Mobile communication. SMS is similar to paging. However, SMS messages do not require the mobile phone to be active and within range and will be held for a number of days until the phone becomes active and within range. SMS messages are transmitted within the same cell or to anyone with roaming service capability. They can also be sent to digital phones from a web site equipped with PC Link or from one digital phone to another. Typical uses of SMS include notifying a mobile phone owner of a voicemail message, notifying a salesperson of an inquiry and contact to call, notifying a doctor of a patient with an emergency problem, notifying a service person of the time and place of their next call, and notifying a driver of the address of the next pickup.

Typically, wireless operators use a short message peer to peer (SMPP) protocol to allow third parties send and receive SMS messages on the wireless network. The SMPP protocol is an open, industry standard messaging protocol designed to simplify integration of data applications with wireless mobile networks.

SUMMARY

In one embodiment, a method for processing queries initiated by users of mobile devices includes receiving an incoming message containing a query initiated by a user of a mobile device, and extracting the query from the received message. The message further includes obtaining a result of the query and creating an outgoing message with the result of the query for delivery to the mobile device.

BRIEF DESCRIPTION OF DRAWINGS

The present invention is illustrated by way of example and not limitation in the figures of the accompanying drawings, in which like references indicate similar elements and in which.

DETAILED DESCRIPTION

Overview of One Embodiment

Figure 1:
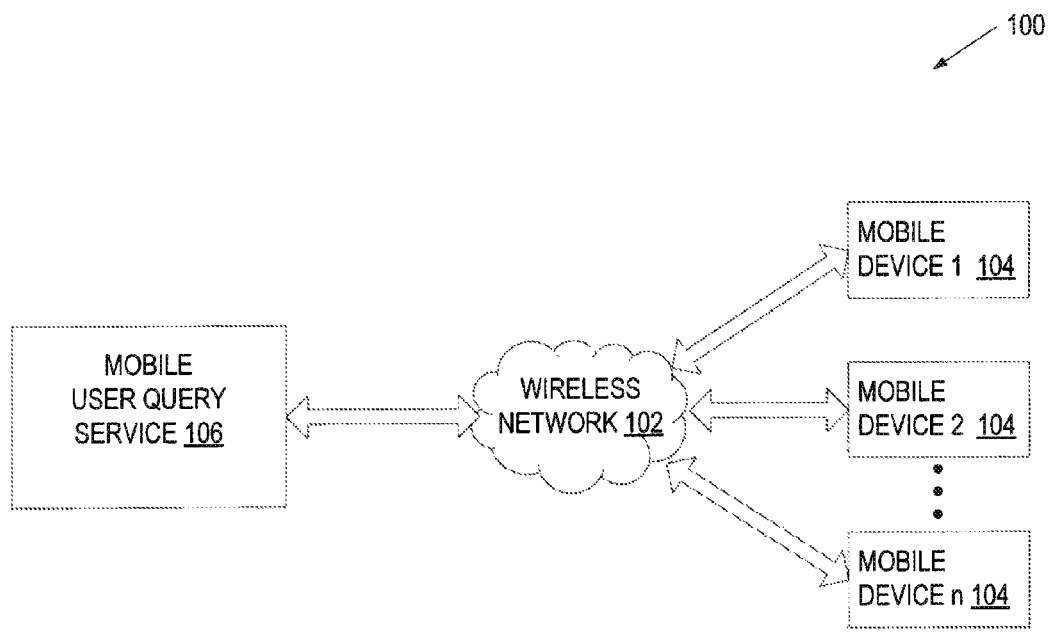
FIG. 1 presents a diagram illustrating an overview of one embodiment of the present invention.

Methods and systems for processing queries initiated by users of mobile devices are described. FIG. 1 presents a diagram illustrating an overview of one embodiment of the present invention.

Referring to FIG. 1, mobile devices 104 are interactive communication devices. For example, mobile devices 104 may be wireless telephones, palm-sized computing devices, PDAs, or Internet-capable appliance remote controllers. The mobile devices 104 allow their users to initiate queries (e.g., by entering queries on the mobile devices 104 or by providing voice queries to the mobile devices 104) and then create messages containing the user-initiated queries. These messages may be, for example, Short Messaging Service (SMS) messages, Multimedia Message Service (MMS) messages, and electronic mail (email) messages.

The mobile devices 104 may communicate wirelessly with a mobile user query service 106 via a wireless network 102. A wide variety of communication techniques known in the art can be used to enable communication between the mobile user query service 106 and mobile devices 104.

The mobile user query service 106 is responsible for receiving messages transmitted by the mobile devices 104, obtaining results for queries included in the received messages, creating outgoing messages with the query results, and causing the outgoing messages to be delivered to the corresponding mobile devices 104. The outgoing messages may be, for example, SMS messages, MMS messages, and email messages. Upon receiving these messages, the mobile devices 104 display the requested query results to the users.

References throughout this specification to "one embodiment" or "an embodiment" indicate that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

System Architecture

Figure 2:
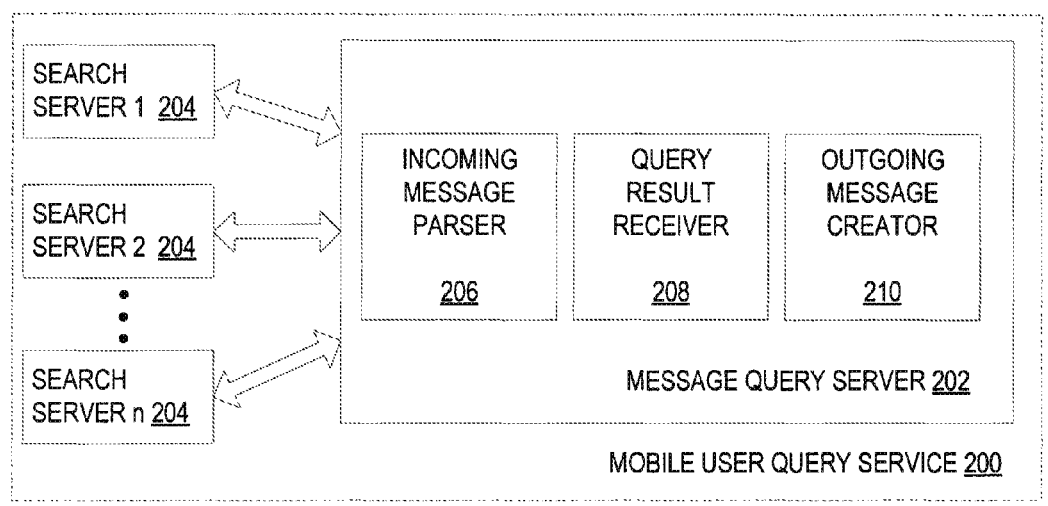
FIG. 2 is a block diagram of one embodiment of a mobile user query service.

FIG. 2 is a block diagram of one embodiment of a mobile user query service 200. The mobile user query service 200 includes a message query server 202 and a set of search servers 204. The message query server 202 is responsible for receiving incoming messages with queries initiated by users of mobile devices, obtaining results for the user-initiated queries from corresponding search servers 204, and creating outgoing messages with the query results for delivery to the mobile devices.

The search servers 204 are responsible for producing results for different query types. In one embodiment, each search server 204 is responsible for producing results for certain query types. For example, the first search server 204 may be providing responses to yellow page (YP) queries (e.g., queries about businesses in specific geographic areas), the second search server 204 may be providing responses to driving direction queries (e.g., queries about driving directions from point A to point B), the third search server 204 may be providing responses to headline news queries (e.g., queries about headline news associated with a specific topic), etc.

In one embodiment, the message query server 202 includes an incoming message parser 206, a query result receiver 208, and an outgoing message creator 210.

The incoming message parser 206 is responsible for receiving messages with user-initiated queries and extracting the queries from the messages. The messages may be, for example, SMS messages, MMS messages, and email messages. In one embodiment, the incoming message parser 206 is also responsible for determining the type of each query and forwarding the query to the search engine processing queries of this type. The query type may be, for example, the YP type, the driving direction type, the headline news type, the phone book type (e.g., queries about addresses and/or phone numbers of businesses or residences), a product type (e.g., queries about prices of specific products), a calculator type (e.g., queries about specific calculations), a glossary type (e.g., queries about definitions of words or phrases), the stock ticker type (e.g., queries about stock quotations), the map type (e.g., queries about local maps), etc. In one embodiment, the incoming message parser 206 determines the query type by analyzing the syntax of the query. For example, the query may be preceded by a query type indicator (e.g., the letter "n" for headline news queries, the letter "f" for product queries, etc.). In another embodiment, the incoming message parser 206 determines the query type by analyzing the semantics of the query.

The query result receiver 208 is responsible for receiving query results from corresponding search servers 204.

The outgoing message creator 210 is responsible for creating an outgoing message for each query result. The message may be, for example, an SMS message, a MMS message, or an email message. In one embodiment, the outgoing message matches the type of the corresponding incoming message (e.g., both incoming and outgoing messages are SMS messages). Alternatively, the corresponding incoming and outgoing messages may be of different types (e.g., the incoming message may be an SMS message, and the outgoing message may be an MMS message).

In one embodiment, the outgoing message creator 210 determines whether the size of the outgoing message exceeds an allowed size (e.g., 160 bytes for SMS messages). If so, the outgoing message creator 210 splits the message into multiple messages and forwards each of the multiple messages to the corresponding mobile device. In one embodiment, the outgoing message creator 210 adds a sequence indicator to each of the multiple messages to specify the sequence of a relevant query result portion with respect to the other portions of this query result (e.g., the indicator "⅔" may specify that this query result portion is the second portion of the query result consisting of three portions).

Figure 3:
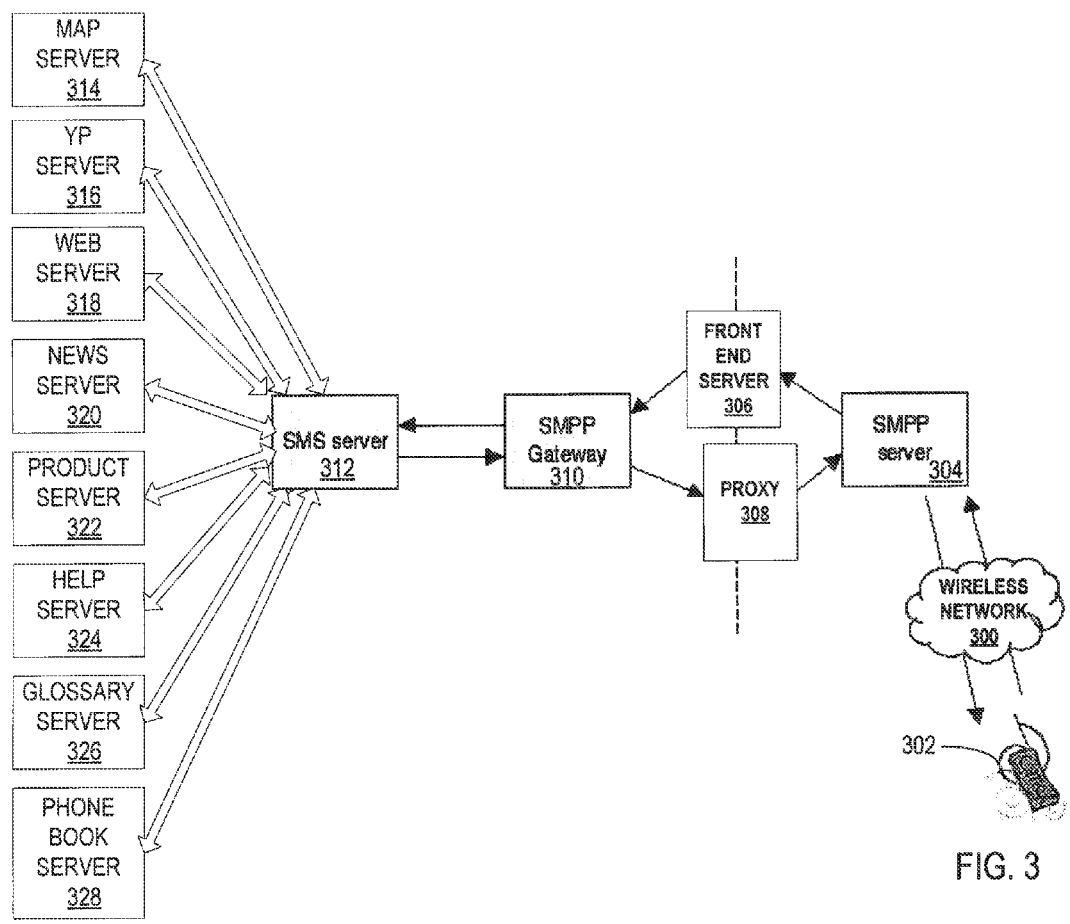
FIG. 3 illustrates an architecture in which one embodiment of the present invention may be implemented.

FIG. 3 illustrating an architecture in which one embodiment of the present invention may be implemented. This exemplary architecture utilizes SMS messages and the SMPP (Short Message Peer to Peer) protocol.

Referring to FIG. 3, a mobile phone 302 is coupled to a SMPP server 304 of the wireless carrier via a wireless network 300. When the user of the mobile phone 302 sends an SMS message to a specific phone number (e.g., the phone number associated with a mobile user query service), the wireless carrier sends the SMS message to the SMPP server 304, which routes the message to an SMPP gateway 310 of the mobile user query service via a front end server 306 of the mobile user query service.

The SMPP gateway 310 sends the SMS message to the SMS server 312, which extracts the query specified by the user of the mobile device 302, determines the type of the query, and sends the query to a corresponding search server. Depending on the query type, the corresponding search server may be a map server 314 (e.g., responsible for providing driving directions), a YP server 316, a web server 318 (e.g., responsible for providing web content), a news server 320, a product server 322, a help server 324 (e.g., responsible for providing help information), or any other query server not shown in FIG. 3.

The relevant search server produces a result for the query and sends it back to the SMS server 312, which formats the query result and sends the resulting SMS message to the SMPP gateway 310. The SMPP gateway splits the SMS message if needed (e.g., if the size of the SMS message exceeds 160 bytes), and forwards each of the split messages to the SMPP server 306 via a proxy 308.

The SMPP server 306 sends the SMS message (or multiple SMS messages) to the wireless network 300. The mobile phone 302 then receives the message and displays the message to the user. If the mobile phone 302 receives multiple messages containing portions of the same query result, the mobile phone 302 displays the first query result portion and allows the user to request the next query result portion (e.g., by providing a link to the next query result portion at the end of the first query result portion).

Hence, when the user of the mobile phone 302 initiates a query, the user is provided with the query result in real time.

In another embodiment, a single server is used, combining the SMS server 312 and the SMPP gateway 310. In yet another embodiment, the SMPP gateway 310 may be used to communicate with different wireless carries. In still another embodiment, the SMPP gateway 310 may be configured to communicate with different external servers (e.g., an SMS server, an MMS server, a mail server, etc.) to exchange messages of various types (e.g., SMS messages, MMS messages, email messages, etc.).

In one embodiment, multiple SMPP gateways 310 and SMS servers 312 are provided to handle a large amount of messages.

DESCRIPTION OF PROCESSES

Figure 4:
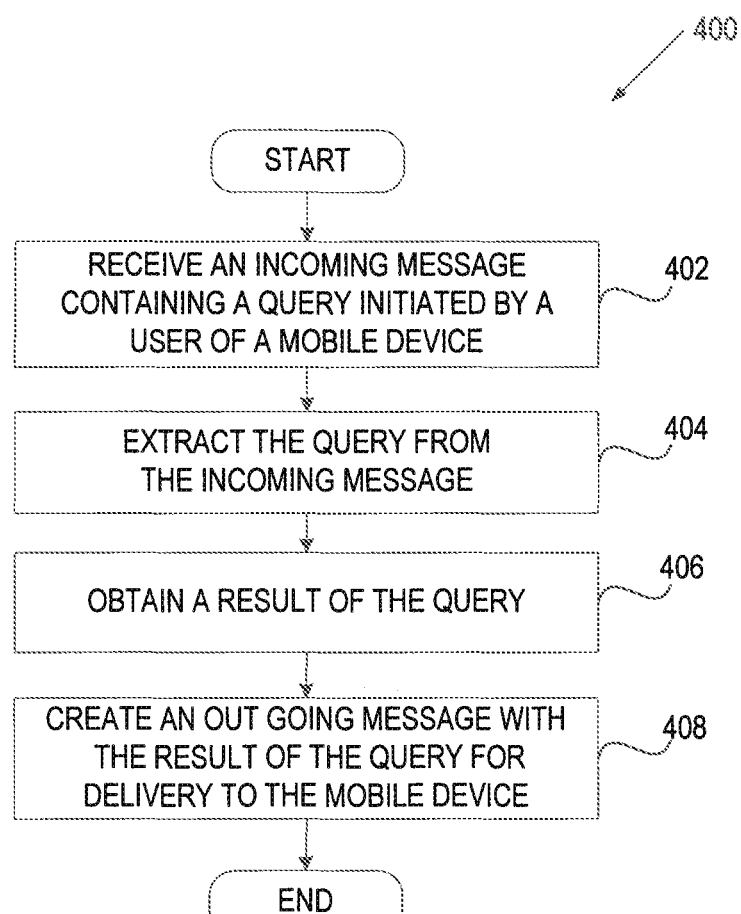
FIG. 4 presents a flow diagram of one embodiment of a method for processing queries initiated by users of mobile devices.

FIG. 4 presents a flow diagram of one embodiment of a method 400 for processing queries initiated by users of mobile devices. The method may be performed by processing logic, which may comprise hardware, software, or a combination of both. Processing logic may reside either in a server (e.g., a message query server 202 of FIG. 2), or partially or entirely in a separate device and/or system(s).

At block 402, processing logic receives an incoming message containing a query initiated by a user of a mobile device. The user may initiate a query by entering the query on the mobile device or by providing a voice query to the mobile device. The voice query may then be interpretend by a speech recognition module of the mobile device or a speech recognition module at a server (e.g., the message query server 202). The incoming message containing the user-initiated query may be, for example, an SMS message, a MMS message or an email message.

At block 404, processing logic extracts the query from the received incoming message. In one embodiment, processing logic also extracts from the incoming message an identifier (e.g., a phone number) of the mobile device of the user. In one embodiment, in which the query is a voice query, extracting the query includes processing the voice query using a speech recognition module.

At block 406, processing logic obtains a result of the query. In one embodiment, processing logic obtains the query result by sending the query to a search server, and receiving the query result from the search server. Alternatively, processing logic may obtain the query result in a different manner. For example, processing logic may format the extracted query into a database query (e.g., an SQL query), submit the database query to a database engine, and receive a response from the database engine. One embodiment of a process for obtaining a query result will be discussed in greater detail below in conjunction with FIG. 5.

At block 408, processing logic creates an outgoing message with the query result for delivery to the mobile device of the user. The outgoing message may be, for example, an SMS message, an MMS message, or an email message. The outgoing message may include the query result and the identifier of the user's mobile device (e.g., the phone number). In one embodiment, the outgoing message matches the type of the corresponding incoming message (e.g., both incoming and outgoing messages are SMS messages). Alternatively, the corresponding incoming and outgoing messages may be of different types (e.g., the incoming message may be an SMS message, and the outgoing message may be an MMS message).

In one embodiment, processing logic splits the outgoing message into multiple messages if the size of the outgoing message exceeds an allowed size (e.g., 160 bytes for SMS messages). In one embodiment, processing logic adds a sequence indicator to each of the multiple messages to specify the sequence of a relevant query result portion with respect to the other portions of this query result (e.g., the indicator "⅔" may specify that this query result portion is the second portion of the query result consisting of three portions).

Figure 5:
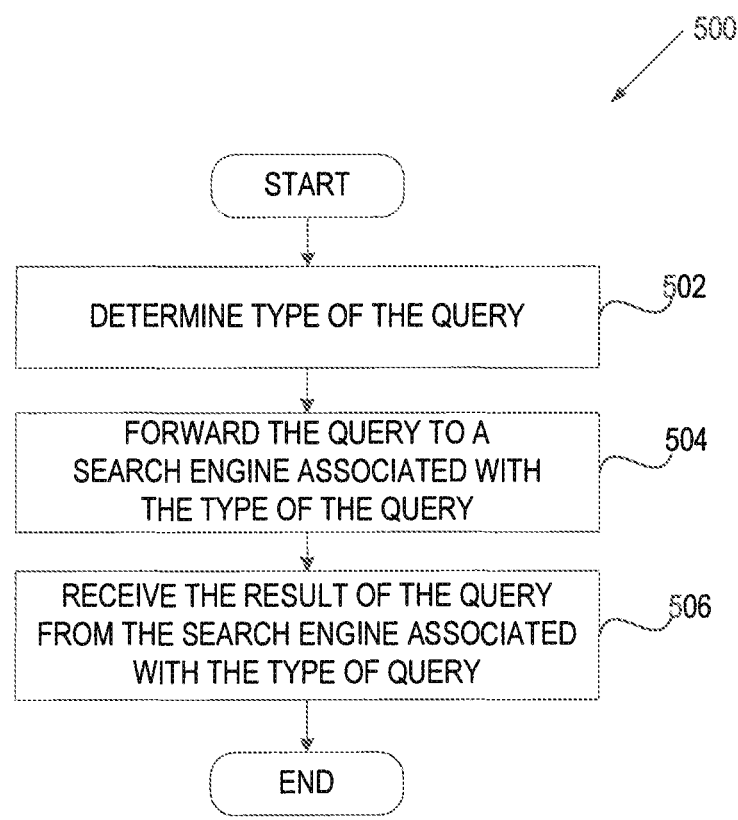
FIG. 5 presents a flow diagram of one embodiment of a method for obtaining a query result.

FIG. 5 presents a flow diagram of one embodiment of a method 500 for obtaining a query result. The method may be performed by processing logic, which may comprise hardware, software, or a combination of both. Processing logic may reside either in a server (e.g., a message query server 202 of FIG. 2), or partially or entirely in a separate device and/or system(s).

At block 502, processing logic determines the type of a query extracted from a message transmitted by a mobile device of a user. For example, the query types may be determined according to methods disclosed in U.S. patent application Ser. No. 09/850,403 titled "Systems and Methods for Providing Map Information" and U.S. patent application Ser. No. 09/956,875 titled "Systems and Methods for Providing Stock Ticker Information", each of the disclosures of which is herein incorporated by reference. In one embodiment, the query type is determined based on the syntax of the query. For example, a query may be preceded by a query type indicator specified by the user (e.g., the user may enter "n olympics" to request a first set of headline news on Olympics, and "n.2 olympics" to request a second set of headline news on Olympics). In one embodiment, the user is provided with a set of available query type indicators via a help query or any other means. In one embodiment, if the query is entered without a query type indicator, processing logic assigns a default query type (e.g., the most popular query type such as the YP type) to the query. Alternatively, processing logic analyzes the semantics of the query to determine the query type if the query is entered without a query type indicator.

In another embodiment, a query type indicator is not required and a query type is assigned automatically based on the semantics of the query (i.e., the user does not specify a query type indicator). For example, processing logic may assign an YP type to the query if it determines that the query contains a store name and a zip code.

In one embodiment, processing logic may assign several query types to the query if more than one type applies.

At block 504, processing logic determines which search engine is responsible for processing the type of this query and forwards the query to this search engine. In one embodiment, processing logic reformats the query into a command recognizable by the search engine and sends the resulting command to the search engine. In one embodiment, processing logic sends the query to multiple search engines if the query is associated with multiple query types.

At block 506, processing logic receives the query result from one or more search engines. If several search results are received, and the combination of these search results exceeds an allowed size of an outgoing message, processing logic may split the outgoing message into multiple messages using the boundaries between the search results.

In one embodiment, if processing logic does not receive any search result, processing logic sends a query to a help search engine, which provides a help message based on the content of the query (e.g., using a keyword scan), and creates an outgoing message including the help message.

Figure 6:
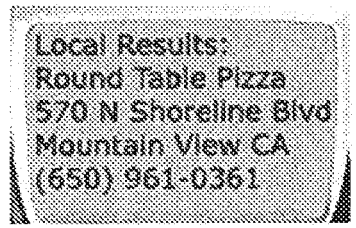
FIG. 6 illustrates an exemplary query result presented to a user of a mobile phone.

FIG. 6 illustrates an exemplary query result displayed on a user's mobile phone. This result is produced in response to the user's YP query (e.g., "pizza mountain view ca", "round table pizza mountain view ca", "pizza 94040", etc.).

Driving directions may be displayed on the user's mobile phone if the user enters a query containing a source address and a destination address (e.g., "from 500 oracle parkway 94065 to 1400 amphitheater parkway 94043" or "from 500 oracle parkway redwood city ca to 1400 amphitheater parkway mountain view ca").

A listing for a business may be displayed on the user's mobile phone if the user enters a query containing a business name and a zip code or the city and state. A listing for a residence may be displayed on the user's mobile phone if the user enters a query containing a phone number, or a person's name and a zip code or the city and state (e.g., "650-960-4000" or "Adam Smith Mountain View Calif.").

A product price may be displayed on the user's mobile phone if the user enters a query containing the name of a product (e.g., "ipod 20 gb", "coffee maker", etc.).

A math computation result may be displayed on the user's mobile phone if the user enters a query containing a math problem involving, for example, a basic arithmetic or more complex math, units of measure and conversions, physical constants, etc. (e.g., "5+2*2", "2A2Q", "sqrt(-2)", "half a cup in teaspoons", "160 pounds*4000 feet in calories, etc.).

A definition for a word or phrase may be displayed on the user's mobile phone if the user enters a query containing a word or a phrase to be defined (e.g., "define SMS", "define query", etc.).

Headline news may be displayed on the user's mobile phone if the user enters a query containing a news topic (e.g., "iraq", "google", etc.).

A correct spelling of a word or a phrase may be displayed on the user's mobile phone if the user enters a query containing an incorrectly spelled word or phrase and asks for spelling of a word or a phrase (e.g., "spelling immediately"). In addition, if the query entered by the user contains a typographical error and no results were found, the query is automatically corrected, the result for the corrected query is obtained and returned to the user, and the user is notified of the corrected spelling.

Additional query types processed by various embodiments of the present invention may include, for example, stock quotes, sport scores, flight information, movie times, etc.

Exemplary Computer System

Figure 7:
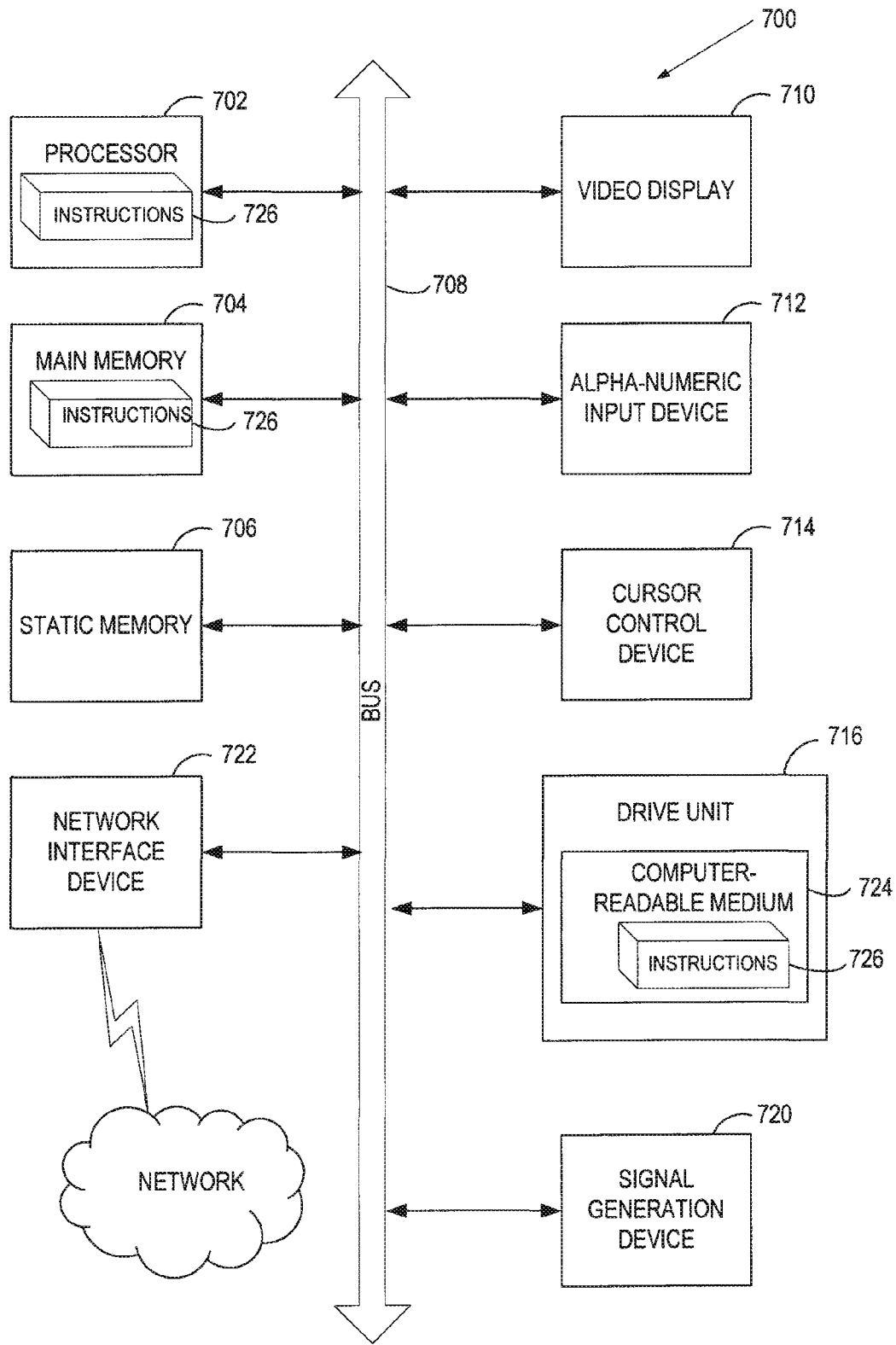
FIG. 7 is a block diagram of one embodiment of a computer system.

FIG. 7 shows a diagrammatic representation of a machine in the exemplary form of a computer system 700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processor 702 (e.g., a central processing unit (CPU) a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software 724) embodying any one or more of the methodologies or functions described herein. The software 724 may also reside, completely or at least partially, within the main memory 704 and/or within the processor 702 during execution thereof by the computer system 700, the main memory 704 and the processor 702 also constituting machine-readable media.

The software 724 may further be transmitted or received over a network 726 via the network interface device 720.

While the machine-readable medium 722 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to included, but not be limited to, solid-state memories, optical and magnetic media, and carrier wave signals.

General Legal Statements

The processes described above can be stored in a memory of a computer system as a set of instructions to be executed. In addition, the instructions to perform the processes described above could alternatively be stored on other forms of machine-readable media, including magnetic and optical disks. For example, the processes described could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the processes as discussed above could be implemented in additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.); etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A computer-implemented method comprising:
receiving a query message that is formatted as a Short Messaging Service (SMS) message, a Multimedia Message Service (MMS) message, or an e-mail message;
identifying textual characters in the query message that correspond to user-provided parameters;
extracting the identified textual characters as one or more terms from text of the query message that is formatted as an SMS message, an MMS message, or an e-mail message;
generating a search query that includes the one or more terms from the text of the query message that is formatted as an SMS message, an MMS message, or an e-mail message;
transmitting the generated search query that includes the one or more query terms that were obtained from the text of the query message that is formatted as an SMS message, an MMS message, or an e-mail message, to a search engine that (i) indexes content of one or more web resources, and (ii) outputs, as search results, data identifying web resources whose indexed content is associated with query terms of search queries; and receiving, from the search engine, search results for the generated search query that includes the one or more query terms that were obtained from the text of the query message that is formatted as an SMS message, an MMS message, or an e-mail message.

2. The method of claim 1, comprising:

generating a results message based on the search results for the generated search query that includes the one or more query terms that were obtained from the text of the query message that is formatted as an SMS message, an MMS message, or an e-mail message, wherein the results message is also formatted as an SMS message, an MMS message, or an e-mail message; and transmitting the results message that is formatted as an SMS message, an MMS message, or an e-mail message, in reply to receiving the query message.

3. The method of claim 2, wherein generating a results message based on the search results for the generated search query that includes the one or more query terms that were obtained from the text of the query message that is formatted as an SMS message, an MMS message, or an e-mail message, wherein the results message is also formatted as an SMS message, an MMS message, or an e-mail message, comprises:

identifying a format of the query message;

selecting a format for the results message that is the same as the format of the query message; and generating the results message in the format selected for the results message.

4. The method of claim 2, comprising:

determining that a size of a results message based on the search results for the generated search query that includes the one or more query terms that were obtained from the text of the query message that is formatted as an SMS message, an MMS message, or an e-mail message, would exceed a maximum allowed size, wherein the results message is also formatted as an SMS message, an MMS message, or an e-mail message; and in response to determining that a size of a results message based on the search results for the generated search query would exceed a maximum allowed size, splitting the results messages into multiple results messages that are each formatted as an SMS message, an MMS message, or an e-mail message.

5. The method of claim 4, comprising:

identifying a format of the query message;

selecting a format for the results message that is the same as the format of the query message; and determining the maximum allowed size for the format for the results message.

6. The method of claim 4, wherein splitting the results messages into multiple results messages that are each formatted as an SMS message, an MMS message, or an e-mail message comprises:

providing an indicator in each of the multiple results messages that indicates a sequence for the multiple results messages.

7. The method of claim 1, wherein the query message is formatted as a SMS message.

8. The method of claim 1, wherein the query message is formatted as an e-mail message.

9. A system comprising:

one or more computers and one or more storage devices storing instructions that are operable, when executed by the one or more computers, to cause the one or more computers to perform operations comprising:

receiving a query message that is formatted as a Short Messaging Service (SMS) message, a Multimedia Message Service (MMS) message, or an e-mail message;

identifying textual characters in the query message that correspond to user-provided parameters;

extracting the identified textual characters as one or more terms from text of the query message that is formatted as an SMS message, an MMS message, or an e-mail message;

generating a search query that includes the one or more terms from the text of the query message that is formatted as an SMS message, an MMS message, or an e-mail message;

transmitting the generated search query that includes the one or more query terms that were obtained from the text of the query message that is formatted as an SMS message, an MMS message, or an e-mail message, to a search engine that (i) indexes content of one or more web resources, and (ii) outputs, as search results, data identifying web resources whose indexed content is associated with query terms of search queries; and receiving, from the search engine, search results for the generated search query that includes the one or more query terms that were obtained from the text of the query message that is formatted as an SMS message, an MMS message, or an e-mail message.

10. The system of claim 9, the operations comprising:

generating a results message based on the search results for the generated search query that includes the one or more query terms that were obtained from the text of the query message that is formatted as an SMS message, an MMS message, or an e-mail message, wherein the results message is also formatted as an SMS message, an MMS message, or an e-mail message; and transmitting the results message that is formatted as an SMS message, an MMS message, or an e-mail message, in reply to receiving the query message.

11. The system of claim 9, wherein generating a results message based on the search results for the generated search query that includes the one or more query terms that were obtained from the text of the query message that is formatted as an SMS message, an MMS message, or an e-mail message, wherein the results message is also formatted as an SMS message, an MMS message, or an e-mail message, comprises:

identifying a format of the query message;

selecting a format for the results message that is the same as the format of the query message; and generating the results message in the format selected for the results message.

12. The system of claim 9, the operations comprising:

determining that a size of a results message based on the search results for the generated search query that includes the one or more query terms that were obtained from the text of the query message that is formatted as an SMS message, an MMS message, or an e-mail message, would exceed a maximum allowed size, wherein the results message is also formatted as an SMS message, an MMS message, or an e-mail message; and in response to determining that a size of a results message based on the search results for the generated search query would exceed a maximum allowed size, splitting the results messages into multiple results messages that are each formatted as an SMS message, an MMS message, or an e-mail message.

13. The system of claim 12, the operations comprising:
identifying a format of the query message;
selecting a format for the results message that is the same as the format of the query message; and
determining the maximum allowed size for the format for the results message.

14. The system of claim 12, wherein splitting the results messages into multiple results messages that are each formatted as an SMS message, an MMS message, or an e-mail message comprises:
providing an indicator in each of the multiple results messages that indicates a sequence for the multiple results messages.

15. The system of claim 9, wherein the query message is formatted as a SMS message.

16. The system of claim 9, wherein the query message is formatted as an e-mail message.

17. A non-transitory computer-readable medium storing software comprising instructions executable by one or more computers which, upon such execution, cause the one or more computers to perform operations comprising:
receiving a query message that is formatted as a Short Messaging Service (SMS) message, a Multimedia Message Service (MMS) message, or an e-mail message;
identifying textual characters in the query message that correspond to user-provided parameters;
extracting the identified textual characters as one or more terms from text of the query message that is formatted as an SMS message, an MMS message, or an e-mail message;
generating a search query that includes the one or more terms from the text of the query message that is formatted as an SMS message, an MMS message, or an e-mail message;
transmitting the generated search query that includes the one or more query terms that were obtained from the text of the query message that is formatted as an SMS message, an MMS message, or an e-mail message, to a search engine that (i) indexes content of one or more web resources, and (ii) outputs, as search results, data identifying web resources whose indexed content is associated with query terms of search queries; and
receiving, from the search engine, search results for the generated search query that includes the one or more query terms that were obtained from the text of the query message that is formatted as an SMS message, an MMS message, or an e-mail message.

18. The medium of claim 17, comprising:

generating a results message based on the search results for the generated search query that includes the one or more query terms that were obtained from the text of the query message that is formatted as an SMS message, an MMS message, or an e-mail message, wherein the results message is also formatted as an SMS message, an MMS message, or an e-mail message; and transmitting the results message that is formatted as an SMS message, an MMS message, or an e-mail message, in reply to receiving the query message.

* * * * *